(12) United States Patent
Hedlund et al.

(10) Patent No.: US 9,672,447 B2
(45) Date of Patent: Jun. 6, 2017

(54) SEGMENTATION BASED IMAGE TRANSFORM

(71) Applicant: CELLAVISION AB, Lund (SE)

(72) Inventors: Sven Hedlund, Genarp (SE); Adam Morell, Lund (SE)

(73) Assignee: CELLAVISION AB, Lund (SE)

( * ) Notice: Subject to any disclaimer, the term of this patent is extended or adjusted under 35 U.S.C. 154(b) by 0 days.

(21) Appl. No.: 15/308,554

(22) PCT Filed: Apr. 28, 2015

(86) PCT No.: PCT/SE2015/050474
§ 371 (c)(1),
(2) Date: Nov. 2, 2016

(87) PCT Pub. No.: WO2015/174906
PCT Pub. Date: Nov. 19, 2015

(65) Prior Publication Data
US 2017/0061256 A1    Mar. 2, 2017

(51) Int. Cl.
*G06K 9/00* (2006.01)
*G06K 9/62* (2006.01)
(Continued)

(52) U.S. Cl.
CPC ........... *G06K 9/6277* (2013.01); *G06K 9/628* (2013.01); *G06T 5/002* (2013.01); *G06T 5/009* (2013.01); *G06T 5/20* (2013.01); *G06T 7/0081* (2013.01); *G06T 11/001* (2013.01); *G06T 2207/10024* (2013.01); *G06T 2207/20076* (2013.01); *G06T 2207/20148* (2013.01); *G06T 2207/30024* (2013.01)

(58) Field of Classification Search
CPC  G06T 5/002; G06T 5/009; G06T 5/20; G06T 7/0081; G06K 9/6277; G06K 9/628
See application file for complete search history.

(56) References Cited

U.S. PATENT DOCUMENTS

2007/0140556 A1* 6/2007 Willamowski ....... G06K 9/0061
                                                        382/167
2008/0056566 A1* 3/2008 Shehata ................... H04N 5/57
                                                        382/167
(Continued)

FOREIGN PATENT DOCUMENTS

EP    1542150 A1    6/2005

OTHER PUBLICATIONS

PCT International Search Report for PCT International Patent Application No. PCT/SE2015/050474, mailed Aug. 10, 2015.

*Primary Examiner* — Kim Vu
*Assistant Examiner* — Molly Delaney
(74) *Attorney, Agent, or Firm* — Holland & Hart LLP

(57) ABSTRACT

The present invention relates to a method for changing the appearance of an original image comprising N>1 classes of image elements, the method comprising the step of: for each pixel and for at least one subset of the original image: calculating N probability values, each probability value defining a probability for the pixel of belonging to a corresponding one of the N classes of image elements, transforming a color of the pixel by using predetermined color transforms for each of the N classes of image elements and the N probability values for the pixel.

15 Claims, 2 Drawing Sheets

(51) Int. Cl.
    *G06T 11/00*     (2006.01)
    *G06T 7/00*     (2017.01)
    *G06T 5/00*     (2006.01)
    *G06T 5/20*     (2006.01)

(56) References Cited

U.S. PATENT DOCUMENTS

| | | | |
|---|---|---|---|
| 2008/0187198 A1* | 8/2008 | Grady | G06K 9/0014 |
| | | | 382/128 |
| 2008/0212868 A1* | 9/2008 | Ramoser | G01N 15/1475 |
| | | | 382/134 |
| 2012/0201451 A1* | 8/2012 | Bryant | H04N 1/60 |
| | | | 382/164 |
| 2016/0098589 A1* | 4/2016 | Brieu | G06K 9/0014 |
| | | | 382/128 |
| 2016/0350914 A1* | 12/2016 | Champlin | G06T 7/0012 |

* cited by examiner

SEGMENTATION BASED IMAGE TRANSFORM

TECHNICAL FIELD

The present invention relates to a method, apparatus and computer program product for changing the appearance of an image, in particular for an image which comprises a plurality of classes of image elements. The present invention further relates to a method, apparatus and computer program product for determining color transforms between a source image and a target image comprising a plurality of classes of image elements.

BACKGROUND OF THE INVENTION

When taking a digital picture of a scene, the colors of the pixels representing the scene depend on a variation of circumstances, for example, under what sort of lighting conditions the picture is taken and what type of image sensor and/or optics is used for taking the picture. Moreover, the colors in the picture further depend on the spectral power distribution of the objects of the scene. The spectral power distribution of an object describes the proportion of total light emitted, transmitted, or reflected by the object at every visible wavelength.

This may cause a problem in the case when two images are taken of the same scene, but under different lighting conditions, or using different types of image sensors and/or optics, and it is desired to change the appearance of the first image such that it looks like the other image.

US 2012/201451 A1 (Apple Inc) provides a computer program for matching colors of a first image to colors of a second image. The computer program identifies a set of transforms for converting the first image to a device-independent color space. The computer program modifies the set of transforms such that they segment colors of the first image into a set of segmented colors. The computer program applies the modified set of transforms to pixel values of the first image in order to segment the pixels of the first image into the set of segmented colors. In the 451' application, the images are thus segmented based on the colors of the images and the transforms applied to the first image for matching the colors to the second image are based on this segmentation.

However, if the scene comprises objects having different spectral power distributions, transforming each pixel based on the color of the pixel may give an incorrect result. This problem is also known as metamerism.

SUMMARY OF THE INVENTION

In view of the above, an objective of the invention is to solve or at least reduce one or several of the drawbacks discussed above. Generally, the above objective is achieved by the attached independent patent claims.

The present invention is based upon the realization that it may be advantageous to change the appearance of an image comprising a plurality of classes of image elements using a segmentation based algorithm. Moreover, the present invention is based upon the realization that it may be difficult to assign each pixel in such an image to a specific one of the plurality of image classes with a 100% certainty. Consequently, a probability based approach may be advantageous.

According to a first aspect, the present invention is realized by a method for changing the appearance of an original image comprising N>1 classes of image elements, the method comprising the steps of: for each pixel and for at least one subset of the original image: calculating N probability values, each probability value defining a probability for the pixel of belonging to a corresponding one of the N classes of image elements, transforming a color of the pixel by using predetermined color transforms for each of the N classes of image elements and the N probability values for the pixel, and storing a resulting color transformed image as an edited image.

A probability based algorithm for changing the appearance of the original image is achieved by calculating N probability values for each pixel and by using these values when transforming the color of the pixel. This is advantageous when changing the appearance of pixels for which a specific one of the plurality of image classes with a 100% certainty cannot be decided. Examples of such pixels may be pixels near the border between two image elements. Moreover, using this probability based approach of segmenting the original image into the N image classes, a more smooth transition between two neighboring image elements may be achieved which may be perceived as better looking for a viewer of the resulting color transformed image.

By the term "transforming a color of the pixel" should, in the context of the present specification, be understood that for example the RGB values of the pixels are changed from a first set of values to a second set of values.

By the term "storing a resulting color transformed image as an edited image" should, in the context of present specification, be understood that the resulting color transformed image is stored in any type of computer memory, for example primary memory such as RAM, or secondary memory such as tape, magnetic disks and optical discs. Moreover, it should be noted that when changing the appearance of a digital image, the image having changed appearance, or the edited image, is inevitably stored in some sort of memory both during the process of changing the appearance and after the process being finished.

According to some embodiments, each probability value is in the range of 0 to 1, and a sum of the N probability values for a pixel equals to 1. In other words, the probabilities values are normalized for each pixel.

According to some embodiments, the step of transforming the color of the pixel comprises the steps of: calculating a specific color transform to be used for the pixel by, for each class of image elements of the N classes of image elements, multiplying the probability value for the pixel of belonging to the class of image elements with the color transform provided for the class of image elements, and summing the N products of the N multiplications, and transforming the color of the pixel by multiplying an original color of the pixel with the specific color transform for the pixel.

This may reduce the calculation complexity when transforming the color of a pixel, for example if the color transform provided for a class of image elements is represented by 32 bit values while the color values of the pixel is represented by 64 bit values.

According to some embodiments, the original image depicts a blood sample. Due to the structure of a blood sample, the color transforms for the N classes of image elements, i.e. different substances in the blood sample, may greatly vary. Consequently, a segmentation based approach for changing the appearance of an image of a blood sample may be advantageous. Moreover, it may be difficult to, with a 100% certainty, label each pixel in such an image as one of the N image classes, which may make the probability based approach particularly advantageous.

According to some embodiments, the N classes of image elements comprise a class for cytoplasm of white blood cells and a class for nuclei of white blood cells. In this case, the method may further comprise the steps of: transforming a copy of the original image to an HSL image in an HSL color space, storing pixel values of a high pass filtered L-channel of the HSL image as an L-image and associating each pixel value in the L-image with a probability of belonging to either the class for cytoplasm or the class for nucleus, and after the step of storing the color transformed original image as an edited image, transforming the stored edited image to the HSL color space and adding to the pixel values of the pixels of the L-channel of the stored edited image, a corresponding pixel value in the L-image, wherein the corresponding pixel value is weighted based on its associated probability of belonging to either the cytoplasm class or the nucleus class, and storing the edited image.

It may be so that the lighting conditions, under which the original images were taken, may improve the focus or sharpness for certain image elements of the original image, compared to the resulting color transformed image as described above. In these cases, it may be advantageous to preserve these sharp and in-focus elements in the edited image. For example, the original image may contain image elements, in this case pixels belonging to the class for cytoplasm or the class for nucleus, for which it is particularly advantageous to preserve the sharpness of. For that reason, a copy of the original image may be transformed to an HSL image in an HSL color space. The luminance channel, L-channel, of such an HSL image may comprise a lot of the above mentioned sharpness of such image elements. By multiplying a high pass filtered version of the L-channel with a number greater than 1, the sharpness may be even more improved. By weighting the pixel values of the stored high pass filtered L-channel based on each pixels associated probability of belonging to either the cytoplasm class or the nucleus class, and adding the weighted values to the edited image, the sharpness of the pixels belonging to either the cytoplasm class or the nucleus class in the edited image may be improved. For example, the sum of the probabilities of belonging to the cytoplasm class and the nucleus class may be used. Moreover, for reducing the calculation complexity, only pixels having an associated probability of belonging to either the cytoplasm class or the nucleus class over a certain threshold value are weighted and added to the edited image. Examples of such a threshold value are 1%, 5%, 10% or 50%. An advantageous threshold value may be 1%.

According to some embodiments, the N classes of image elements comprise a class for nuclei of white blood cells. According to this embodiment, after the step of transforming a color of the pixel by using predetermined color transforms, the method further comprising the steps of: increasing the contrast in the resulting color transformed image by using a contrast enhancing function. The contrast enhancing function for a specific pixel in the resulting color transformed image may be based on a probability of belonging to the nucleus class and a luminance of the pixel. After the contrast enhancement, the edited image may be stored.

Since nuclei of white blood cells often are dark, it may be difficult to distinguish the details in a nucleus. The present embodiment may increase the dynamic range of the darker regions, e.g. nuclei, of the image. Consequently, the details which are least visible before the contrast enhancement are enhanced the most.

According to some embodiments, the N classes of image elements comprise a class for red blood cells and a class for a background of the image, and the method further comprises the step of: reducing noise for the pixels of the stored edited image having a probability above a threshold value of belonging to either the class for red blood cells or the class for a background of the blood sample using a smoothing filter and, storing the edited image.

When performing the above mentioned color transformation, in some cases the noise for certain image elements is increased. For example if the image comprises red blood cells and a background, noise in such regions may be increased when performing color transformation. For that reason, it may be advantageous to perform a noise reducing operation on such image elements. In order to reduce the calculation complexity of the operation, and in order to not smooth out pixels with low or very low probability of belonging to the class for red blood cells or the class for a background of the blood sample, only pixels having a probability above a threshold value of belonging to either the class for red blood cells or the class for a background of the blood sample are smoothed out using the smoothing filter. Examples of such a threshold value are 1%, 5%, 10% or 50%. An advantageous threshold value may be 5%. The smoothing filter may be a bilateral filter which is advantageous since it is an edge-preserving and noise-reducing smoothing filter. However, any other type of smoothing filter may be used such as a guided filter or an anisotropic diffusion filter.

According to embodiments, the method further comprises the step of increasing a color saturation of the stored edited image by transforming the stored edited image to an HSL color space and multiplying each pixel in an S-channel of the edited image with a value greater than 1. The value may for example be 1,1, 1,2 or 1,3 or any other value greater than one.

In a second aspect, the present invention provides a computer program product comprising a computer-readable medium with instructions for performing the method according to the first aspect of the invention.

In a third aspect, the present invention provides a device for changing the appearance of an original image comprising N>1 classes of image elements, the device comprising: a processor configured to, for each pixel and for at least one subset of the original image: calculate N probability values, each probability value defining a probability for the pixel of belonging to a corresponding one of the N classes of image elements, transform a color of the pixel by using predetermined color transforms for each of the N classes of image elements and the N probability values for the pixel, and a memory adapted for storing a resulting color transformed image as an edited image.

The second and third aspect may generally have the same features and advantages as the first aspect.

In a fourth aspect, the present invention provides a method for determining color transforms between a source image and a target image comprising N>1 classes of image elements, the method comprising the steps of: for each pixel and for at least one subset of the source and target images: calculating N probability values, each probability value defining the probability for the pixel of belonging to a corresponding one of the N classes of image elements, for each specific image element class of the N classes of image elements, identifying a color transform between the source image and the target image by using: for at least some of the pixels in the source image for which the N probability values have been calculated, color values of the pixel and the probability for the pixel of belonging to the specific class of image elements, and, for at least some of the pixels in the target image for which the N probability values have been calculated, color values of the pixel and the probability for the pixel of belonging to the specific class of image elements.

A probability based algorithm for identifying such a color transform is provided by calculating N probability values for each pixel and for at least one subset of the source and target images, and by using these values when identifying a color transform between the source image and the target image. Using this probability based approach of segmenting the source image and the target image may be advantageous since it may be difficult to, with a 100% certainty, decide if a certain pixel in either of the images belongs to a specific one of the plurality of image classes.

Since a color transform is determined for each specific image element, the algorithm may produce more robust results for images depicting scenes comprising objects having different spectral power distributions as described above.

According to some embodiments, the method for determining color transforms between a source image and a target image comprises using a plurality of source images and a plurality of target images when determining the color transform. A more robust algorithm for determining the color transforms may thus be achieved since the effect of an outlier among either the source images or the target images may be reduced.

According to some embodiments, the source image and the target image are captured under different lighting conditions and/or using different image sensors and/or different optics. As described above, determining a single color transform for transforming the colors of the pixels in the source image, which may be captured under different lighting conditions and/or using different image sensors and/or different optics, to more closely follow the colors of the pixels in the target image may produce an unsatisfying result due to the problem of metamerism.

According to some embodiments, the source image and the target image depict a blood sample and wherein the N classes of image elements comprise at least two of: a class for cytoplasm of white blood cells, a class for nuclei of white blood cells, a class for red blood cells and a class for a background of the images.

Due to the structure of a blood sample, the color transforms for the N classes of image elements, i.e. different substances in the blood sample, between a source image and a target image may greatly vary. Consequently, a segmentation based approach for determining color transforms between a source image and a target image depicting blood sampled may be advantageous. Moreover, it may be hard to with a 100% certainty label each pixel in such images as one of the N image classes, which may make the probability based approach particularly advantageous when determining the color transforms.

In a fifth aspect, the present invention provides a computer program product comprising a computer-readable medium with instructions for performing the method according to the fourth aspect.

In a sixth aspect, the present invention provides a device for determining color transforms between a source image and a target image comprising N>1 classes of image elements, the device comprising a processor configured to, for each pixel and for at least one subset of the source and target images: calculate N probability values, each probability value defining the probability for the pixel of belonging to a corresponding one of the N classes of image elements, for each specific image element class of the N classes of image elements, identifying a color transform between the source image and the target image by using: for at least some of the pixels in the source image for which the N probability values have been calculated, color values of the pixel and the probability for the pixel of belonging to the specific class of image elements, and, for at least some of the pixels in the target image for which the N probability values have been calculated, color values of the pixel and the probability for the pixel of belonging to the specific class of image elements.

The fifth and sixth aspect may generally have the same features and advantages as the fourth aspect.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise.

BRIEF DESCRIPTION OF DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION OF THE INVENTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

The methods described below will be exemplified using images of blood samples. Due to the problem of metamerism, a complex color transform may be required in order to transform the colors of an original image such that they match the colors of an image captured under different lighting conditions and/or using different image sensors and/or different optics. The inventive method described below is breaking down the large and complex problem of transforming a color space of the original image into smaller, solvable problems. This way of changing the appearance of an image to match the appearance of another image may of course be used for other sorts of images, not only for images of blood samples, such as portraits, images of landscapes, interior images etc.

Figure 1:
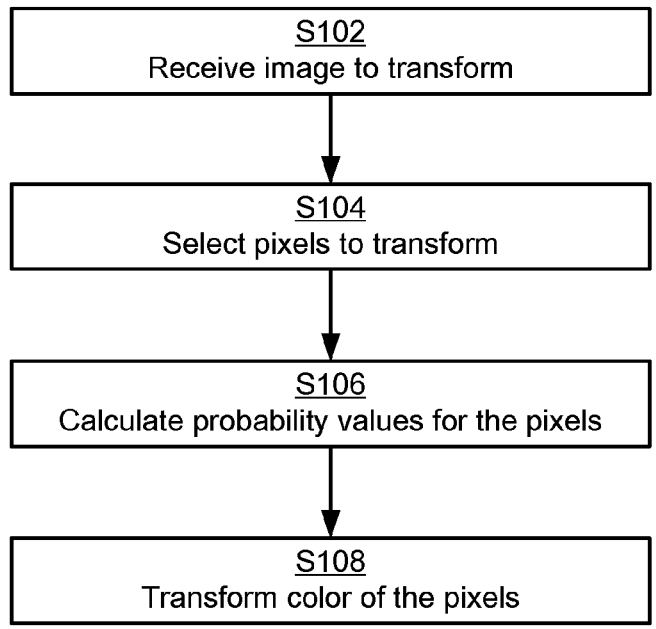
FIG. 1 illustrates a method for changing the appearance of an original image by transforming the colors of the pixels of the original image.

FIG. 1 describes a method for changing the appearance of an original image. The method may start by the device receiving S102 the image to transform, e.g. the original image. The original image comprises N>1 classes of image elements. From that image at least one subset is selected S104. For each pixel in the at least one subset, N probability values are calculated S106. Each probability value defines a probability of the pixel belonging to a corresponding one of the N classes of image elements. Each probability value may be ranging from 0 to 1, and a sum of the N probability values for a pixel may in that case equal to 1.

That is, if (x, y) is the position of a pixel, the probability of the i:th image class, (i∈ {1, ..., N}) is described by the function $p_i(x, y)$ where $0 \leq p_i(x, y) \leq 1$ and $\Sigma_{i=1}^{N} p_i(x, y) = 1$. The final step of the method described in FIG. 1 is the step of transforming the color S108 of each selected pixel by using predetermined color transforms for each of the N classes of image elements and the N probability values for each selected pixel. This step may comprise calculating a specific color transform to be used for each pixel. The specific color transform for a specific pixel may be calculated by, for each class of image elements of the N classes of image elements, multiplying the probability value of the pixel belonging to the class of image elements with the color transform provided for the class of image elements, and summing the N products of the N multiplications. The color transformation for the pixel is then performed by multiplying an original color of the pixel with the specific color transform for the pixel.

The function for changing the color of a certain pixel on the position (x, y) in the image can be described as:

$$v'(x, y) = \begin{bmatrix} r'(x, y) \\ g'(x, y) \\ b'(x, y) \end{bmatrix} = \sum_{i=1}^{N} p_i(x, y) f_i(\theta_i, v(x, y)) \quad \text{equation 1}$$

$$\text{where } v(x, y) = \begin{bmatrix} r(x, y) \\ g(x, y) \\ b(x, y) \end{bmatrix}$$

represents the original color of the pixel, v'(x, y) represents the transformed color of the pixel, $f_i$ is the predetermined color transform for the image class i, and $\theta_i$ is a predetermined parameter vector for $f_i$.

An example of a color transform is a simple affine transform for each individual color component:

$$f_i(\theta_i, v(x, y)) = \begin{bmatrix} \theta_{i1} r(x, y) + \theta_{i2} \\ \theta_{i3} g(x, y) + \theta_{i4} \\ \theta_{i5} b(x, y) + \theta_{i6} \end{bmatrix}$$

where $\theta_{i1}, \theta_{i2}, \ldots, \theta_{i6}$ are real numbers. A more complex example of a color transform is $$f_i(\theta_i, v(x, y)) = \begin{bmatrix} \theta_{i1} r(x, y) + \theta_{i2} g(x, y) + \theta_{i3} b(x, y) \\ \theta_{i4} r(x, y) + \theta_{i5} g(x, y) + \theta_{i6} b(x, y) \\ \theta_{i7} r(x, y) + \theta_{i8} g(x, y) + \theta_{i9} b(x, y) \end{bmatrix} = A_i v(x, y)$$

i.e, here $\theta_i$ is a vector of nine real numbers, which can be organized in a 3*3 matrix, $A_i$. An even more complex example may be when $f_i$ is a nonlinear function of its parameters.

By way of example, the number of image classes may be four, and comprise a class for cytoplasm of white blood cells, a class for nuclei of white blood cells, a class for red blood cells and a class for a background of the images. As described above, the spectral power distribution of those classes may greatly vary, leading to that the predetermined color transforms $A_i$, i ∈ {1, ..., N} also may greatly vary. Consequently, a single color transform for transforming the colors of the original image would produce an unsatisfying resulting color transformed image.

In the following, a probability based approach of segmenting the original image into the N image classes will be briefly outlined. This is just an example of how such a segmentation may be performed. Other ways of calculating N probability values for each pixel in an image, where each probability value defines a probability for the pixel of belonging to a corresponding one of the N classes of image elements is left for the skilled person to implement. The following example relates to segmenting an image of a blood sample into four image classes, namely a class for cytoplasm of white blood cells, a class for nuclei of white blood cells, a class for red blood cells and a class for a background of the image. In the example, a probability value defining a probability for the pixel of belonging to the class for cytoplasm of white blood cells is calculated, but the method can of course be used in similar ways for calculating probability values for the remaining image classes.

The general idea of the exemplary method is as follows: First, a threshold method is used for detecting the nuclei of white blood cells present in the original image. The areas defining the nuclei are enlarged such that the cytoplasms around the detected nucleus also, most likely, are included in the areas. These areas are then inverted such that areas only including the background and the red blood cells are defined. These areas are used for estimating the color distributions of the background and the red blood cells in the original image. These distributions are used to find a rough segmentation of the white blood cell, a preliminary cell mask. The preliminary cell mask is separated into nucleus and cytoplasm using a thresholding method. This provides the segmentation of the nucleus and makes it possible to estimate the color distributions of the cytoplasm and of the nucleus. Having established estimates for all the four regions in the image, the probability of a pixel belonging to a white blood cell can be calculated.

When detecting the nuclei of white blood cells present in the original image, the first step of the exemplary method, the color histogram of the original image is calculated. Since a nucleus is well defined and visible in an image of a blood sample, the color of the nuclei present in the original image will be seen in the histogram, e.g. showing that a nucleus is much bluer than the other image classes present in the original image.

When estimating the color distributions of the background and the red blood cells, firstly a threshold between the two image classes is calculated by calculating a histogram of the green component in the original image. Using the obtained threshold for separating the red cells from the background, estimates are calculated for the mean value and covariance matrix of the background, $\mu_b$ and $C_b$, and of the red cells, $\mu_r$ and $C_r$. The estimated mean values and covariance matrices are used in the probability density functions $h_b(v)$ and $h_r(v)$, showing the color correlation for a pixel color v with the background and red cells, respectively.

The probability density function for a pixel color v, defined by a RGB-vector, for the background is calculated as follows:

$$h_b(v) = \frac{1}{(2\pi)^{3/2} |C_b|^{1/2}} e^{-(v-\mu_b) C_b^{-1} (v-\mu_b)/2} \quad \text{equation 2}$$

The probability density function for the red cells is calculated in a similar way.

The next step comprises separating the nuclei of white blood cells from the cytoplasm of white blood cells. First, a set of pixels, W, which are neither similar to the background nor to the red cells is calculated from the original image. The area of every eight-connected region of pixels in the set W is calculated. Every region with an area greater than a threshold is considered large enough to be a white blood cell, and each such region constitutes a preliminary cell mask. The threshold depends on the zoom level of the original image.

The nucleus of the image is then segmented using any suitable method for segmenting a nucleus of a white blood cell from the cytoplasm, for example using a threshold. The areas calculated in the first step of the exemplary method may be used. The thus calculated nucleus mask may be cleaned by removal of fragments with an area smaller than a certain number of pixels and filling of holes with an area smaller than another number of pixels.

The mean value, $\mu_n$, and covariance matrix, $C_n$, of the nucleus are estimated over the pixels belonging to the nucleus mask. For the cytoplasm, $\mu_c$ and $C_c$, for the pixels in the original image which are dissimilar from the background and red cells and not already defined to be nucleus. The estimated mean values and covariance matrices are used in the probability density functions $h_c(v)$ and $h_n(v)$ representing the color distribution of the cytoplasm and nucleus.

The probability density functions for the cytoplasm and nucleus are calculated according to equation 2.

The probability that a pixel with color v belongs to the cytoplasm of a white blood cell, $p_c(v)$, is then given by:

$$p_c(v) = \frac{h_c(v)}{h_c(v) + h_n(v) + h_b(v) + h_r(b)}$$

It may be noted that this way of calculating a probability value may be used when determining color transforms between a source image and a target image as described below.

Figure 2:
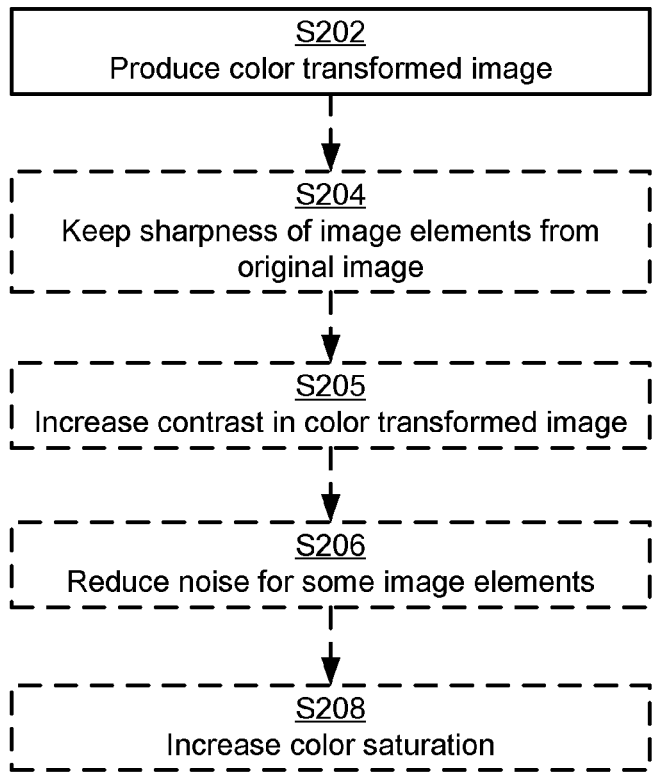
FIG. 2 illustrates a flow diagram for changing the appearance of an original image according to embodiments, FIG. 3 schematically illustrates a device for changing the appearance of an original image according to embodiments.
Figure 3:
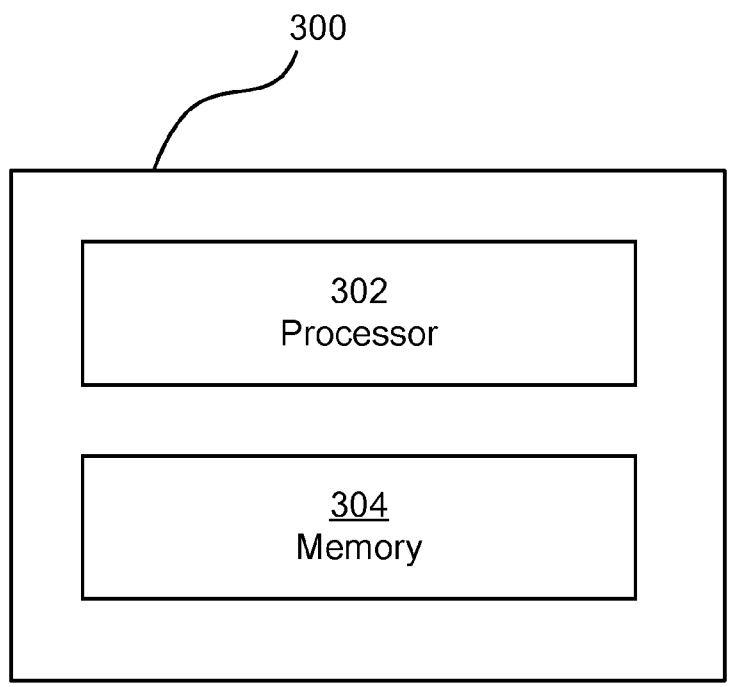

FIG. 2 illustrates a flow diagram for changing the appearance of an original image according to embodiments.

The first step S202 in the flow diagram summarize the steps S102-S108 described in FIG. 1. But except producing a color transformed image as described in conjunction with FIG. 1, the method of changing the appearance of an original image may comprise additional image editing steps in order to improve the color transformed image. The additional steps shown in FIG. 2 and described below may be performed in any suitable order, and any of the additional steps may be excluded.

As mentioned above, the original image may contain wealth of details which may disappear when producing the color transformed image S202. For that reason, the method may contain a step for keeping the wealth of details for certain image elements from the original image. According to embodiments, the N classes of image elements comprise a class for cytoplasm of white blood cells and a class for nuclei of white blood cells. The step S204 may in that case be performed for keeping the focus on details from the original image for these image elements in the edited image. Firstly a copy of the original image is transformed to an HSL image in an HSL color space. The luminance channel of the HSL image comprises the details which advantageously are included in the edited image. Therefore, the pixel values of a high pass filtered L-channel of the HSL image are stored as an L-image and each pixel value in the L-image is associated with a probability of belonging to either the class for cytoplasm or the class for nucleus. The L-image may, according to embodiments, be high pass filtered for increasing the wealth of details in the L-image. Finally, the stored edited image, for example the color transformed image produced by step S202, is transformed to the HSL color space and the pixel values of the pixels of the L-channel of the stored edited image are add together with a corresponding pixel value in the L-image. The corresponding pixel value is weighted based on its associated probability of belonging to either the cytoplasm class or the nucleus class.

After the color transformed image is produced S202, some of the parts of the edited image may be dark and therefore the details in such regions may be lost. This is in principal only something that happens to the nuclei of white blood cells. Therefore, according to embodiments, the method comprises an additional contrast enhancement step S205. According to this embodiment, after the step of transforming a color of the pixel by using predetermined color transforms, the method further comprises the steps of increasing the contrast in the resulting color transformed image by using a contrast enhancing function. The details to be enhanced may according to some embodiments be detected in the green channel of the edited image, which may be the channel containing less noise. This may be advantageous in that the risk of enhancing noise is reduced. The enhancement of the detected details may however be performed in the luminance channel of the edited image, after transforming the edited image to the HSL color space. The contrast enhancing function for a specific pixel, e.g. a detected detail, in the edited image may be based on a probability of belonging to the nucleus class and a luminance of the pixel. This means that the amount of enhancement is decided by the luminance of the pixel, the more luminance a pixel has, the more the pixel is enhanced. The probability of belonging to the nucleus class is used as a further weighting factor.

According to embodiments, the N classes of image elements comprise a class for red blood cells and a class for a background of the image. For these types of image elements, the level of noise may be increased when performing the color transform according to above. Moreover, the importance of perceiving every detail in these types of image elements may not be as large as the importance of perceiving details in other types of image elements for certain types of analyses. Consequently, in order to improve the perceived quality of the edited image, it may be advantageous to perform noise reduction on pixels belonging to these image elements. Thus, according to embodiments, the method of changing the appearance of the original image further comprises the step of reducing noise S206 for the pixels of the stored edited image. The noise reduction may according to some embodiments only be performed on pixels having a probability above a threshold value of belonging to either the class for red blood cells or the class for a background of the blood sample. The noise reduction may be performed by using a smoothing filter, for example a bilateral filter. According to some embodiments, if a pixel is having a probability above a threshold value of belonging to either the class for red blood cells or the class for a background of the blood sample, also the neighboring pixels need to have a probability above a threshold value of belonging to these classes in order to perform noise reduction on the pixel. The threshold for the pixel may differ from the threshold for the neighboring pixels, or the thresholds may be the same.

According to embodiments, the method of changing the appearance of the original image further comprises a step of increasing a color saturation S208 of the stored edited image. This may be done by transforming the stored edited image to an HSL color space and multiplying each pixel in an S-channel of the edited image (now being in the HLS color space) with a value greater than 1.

The method described in conjunction with FIGS. 1-2 above may be implemented in software, firmware, hardware or a combination thereof on a device 300 having processing capabilities 302. The device 300 is configured for changing the appearance of an original image comprising N>1 classes of image elements.

In a hardware implementation, the division of tasks between functional units referred to in the below description does not necessarily correspond to the division into physical units; to the contrary, one physical component may have multiple functionalities, and one task may be carried out by several physical components (e.g. processors) in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media).

The processor 302 of the device 300 may be configured to, for each pixel and for at least one subset of the original image: calculate N probability values. Each probability value defines a probability of the pixel belonging to a corresponding one of the N classes of image elements. The processor 302 may further be configured to transform a color space of each pixel by using predetermined color transforms for each of the N classes of image elements and the N probability values for each of the pixels. The N predetermined color transforms may be accessible for the processor 302 in any suitable way. For example, the N predetermined color transforms may be stored in a memory 304 of the device 300.

As is well known to a person skilled in the art, the term memory includes both volatile and non-volatile, removable and non-removable memory implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer.

The memory 304 may further be adapted for storing a resulting color transformed image as an edited image. During the process of changing the appearance of the original image, as described in conjunction with FIGS. 1-2 above, the image, or the pixels in the image, are continuously stored in some sort of memory, preferably RAM for easy and fast access from the processor 302. The resulting color transformed image is thus inevitably stored in some sort of memory of the device 300.

Figure 4:
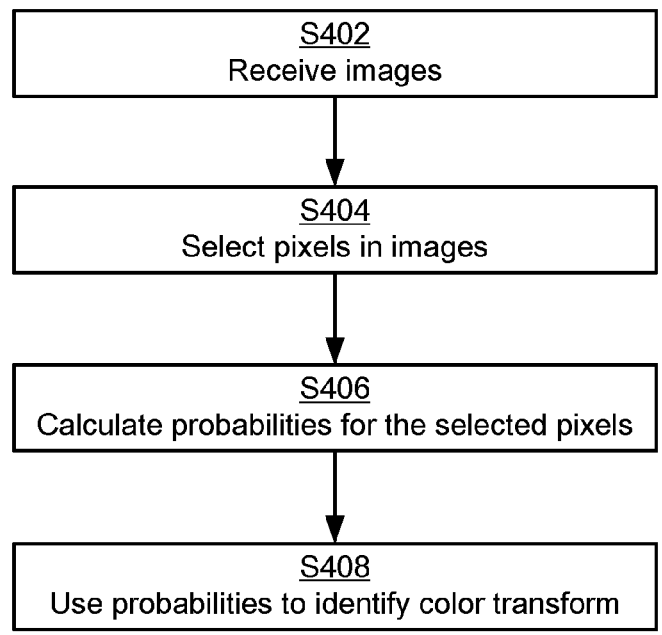
FIG. 4 illustrates a method for determining color transforms between a source image and a target image.

Below, an embodiment providing the N predetermined color transforms is described in conjunction with FIG. 4. The method described in FIG. 4 uses only one source image and one target image, i.e. one image pair depicting the same scene but captured under different lighting conditions and/or using different image sensors and/or different optics. Later below will the same method, but for a plurality of such image pairs, be described.

The method starts with receiving S402 the target image and the source image. For both images, at least one subset of each image is selected S404. Preferably, the images are cropped in the same way such that the same scene is depicted in both images.

For each pixel in the selected at least one subset of the source image and the target image, N probability values are calculated S406. Each probability value defines the probability of the pixel belonging to a corresponding one of the N classes of image elements. The method continues by for each specific image element class of the N classes of image elements, identifying a color transform between the source image and the target image. The color transform for a specific image element is identified S408 using for at least some of the pixels in the source image for which the N probability values have been calculated, color values of the pixel and the probability of the pixel belonging to the specific class of image elements, and, for at least some of the pixels in the target image for which the N probability values have been calculated, color values of the pixel and the probability of the pixel belonging to the specific class of image elements. According to embodiments, all of the pixels in the source image and the target image for which the N probability values have been calculated are used when identifying a color transform between the source image and the target image for a specific class of image elements.

According to embodiments, a plurality of image pairs are used when identifying color transforms for the N classes of image elements. As mentioned above, each image pair is depicting the same scene but the two images, i.e. the source image and the target image, are captured under different lighting conditions and/or using different image sensors and/or different optics. All the source images in the plurality of image pairs are captured under the same (or almost the same) lighting conditions and using the same image sensors and the same optics. The same is valid for the plurality of target images. The identified color transforms may then be used for transforming the colors of an image captured under the same conditions (or almost the same conditions) as the source images, such that it looks like it was captured under the same conditions as the target images. If $Z^+$ denotes all positive numbers, $M^j \subset Z^+ \times Z^+$ is the set of all pixel coordinates (or all pixel coordinates in the at least one subset as described above) in image j. If i denotes the different image classes, $\in \{1, \ldots, N\}$, $p_i^j(x, y)$ is the probability value for image class i and image j for a certain pixel coordinate (x, y). The probability value may range from 0 to 1, and a sum of the N probability values for a pixel may in this case be equal to 1. $r^j(x, y)$, $g^j(x, y)$, $b^j(x, y)$ are the values for red, green and blue in position (x, y) in source image j. The values may be real numbers ranging from 0 to 255. The mean values for red in image class i for image j is denoted $\bar{r}_i^j$. The same goes for green, $\bar{g}_i^j$, and blue $\bar{b}_i^j$.

The weighted mean value for red in source image j, the pixels belonging to class l, is thus calculated by:

$$\bar{r}_i^j = \frac{\sum_{(x,y) \in M^j} p_i^j(x, y) r^j(x, y)}{\sum_{(x,y) \in M^j} p_i^j(x, y)} \quad \text{equation 3}$$

and the mean values for green, $\bar{g}_i^j$, and blue $\bar{b}_i^j$ in source image j are calculated in the same way.

The corresponding mean values for target image j are calculated in the same way and are denoted $\hat{\bar{r}}_i^j$ $\hat{\bar{g}}_i^j$ and $\hat{\bar{b}}_i^j$.

In the case of using only one image pair, color transforms with only one parameter per color can be calculated, e.g.

$$f_i(\theta_i, v(x, y)) = \begin{bmatrix} \theta_{i1} r(x, y) \\ \theta_{i2} g(x, y) \\ \theta_{i3} b(x, y) \end{bmatrix}$$

If at least three image pairs are used, a matrix color transform $A_i$ for image class i can be calculated using least squares estimation as follows.

The number of image pairs is n. Then the matrix with all color mean values for image class i for the source images is:

$$C_i = \begin{bmatrix} \bar{r}_i^1 & \bar{g}_i^1 & \bar{b}_i^1 \\ \bar{r}_i^2 & \bar{g}_i^2 & \bar{b}_i^2 \\ \vdots \\ \bar{r}_i^n & \bar{g}_i^n & \bar{b}_i^n \end{bmatrix}$$

and the matrix with all color mean values for image class i for the target images is:

$$\hat{C}_i = \begin{bmatrix} \hat{\bar{r}}_i^1 & \hat{\bar{g}}_i^1 & \hat{\bar{b}}_i^1 \\ \hat{\bar{r}}_i^2 & \hat{\bar{g}}_i^2 & \hat{\bar{b}}_i^2 \\ \vdots \\ \hat{\bar{r}}_i^n & \hat{\bar{g}}_i^n & \hat{\bar{b}}_i^n \end{bmatrix}$$

Then the color transform matrix A for image class i, $A_i$, i $\in \{1, \ldots, N\}$, which is used in equation 1 above, can be calculated using the least square method. Theoretically, this can be calculated as:

$$A_i = \hat{C}_i^T C_i (C_i^T C_i)^{-1} \qquad \text{equation 3}$$

but in practice, there are better numerical algorithms available.

As described above, according to embodiments, the source image and the target image depict a blood sample and the N classes of image elements comprise at least two of: a class for cytoplasm of white blood cells, a class for nuclei of white blood cells, a class for red blood cells and a class for a background of the images.

The person skilled in the art realizes that the present invention by no means is limited to the preferred embodiments described above. On the contrary, many modifications and variations are possible within the scope of the appended claims. For example, an image element class may comprise more than one type of object, if the objects in the image element class have similar spectral power distributions.

The invention claimed is:

1. A method for changing the appearance of an original image comprising N>1 classes of image elements, the method comprising the steps of:
for each pixel and for at least one subset of the original image:
calculating N probability values, each probability value defining a probability for the pixel of belonging to a corresponding one of the N classes of image elements,
transforming a color of the pixel by using predetermined color transforms for each of the N classes of image elements and the N probability values for the pixel,
and storing a resulting color transformed image as an edited image,
wherein the step of transforming the color of the pixel comprises the steps of:
calculating a specific color transform to be used for the pixel by, for each class of image elements of the N classes of image elements, multiplying the probability value for the pixel of belonging to the class of image elements with the color transform provided for the class of image elements, and summing the N products of the N multiplications, and
transforming the color of the pixel by multiplying an original color of the pixel with the specific color transform for the pixel.

2. The method of claim 1, wherein each probability value is in the range of 0 to 1, and wherein a sum of the N probability values for a pixel equals to 1.

3. The method of claim 1, wherein the original image depicts a blood sample.

4. The method of claim 1, wherein the N classes of image elements comprise a class for cytoplasm of white blood cells and a class for nuclei of white blood cells, and wherein the method further comprises the steps of:
transforming a copy of the original image to an HSL image in an HSL color space,
storing pixel values of a high pass filtered L-channel of the HSL image as an L-image and associating each pixel value in the L-image with a probability of belonging to either the class for cytoplasm or the class for nucleus,
and after the step of storing the color transformed original image as an edited image,
transforming the stored edited image to the HSL color space and adding to the pixel values of the pixels of the L-channel of the stored edited image, a corresponding pixel value in the L-image, wherein the corresponding pixel value is weighted based on its associated probability of belonging to either the cytoplasm class or the nucleus class,
and storing the edited image.

5. The method of claim 1, wherein the N classes of image elements comprise a class for nuclei of white blood cells and wherein, after the step of transforming a color of the pixel by using predetermined color transforms, the method further comprising the steps of:
increasing the contrast in the resulting color transformed image by using a contrast enhancing function, wherein the contrast enhancing function for a specific pixel in the resulting color transformed image is based on a probability of belonging to the nucleus class and a luminance of the pixel,
and storing the edited image.

6. The method according to claim 1, wherein the N classes of image elements comprise a class for red blood cells and a class for a background of the image, and wherein the method further comprises the step of:
reducing noise for the pixels of the stored edited image having a probability above a threshold value of belonging to either the class for red blood cells or the class for a background of the blood sample using a smoothing filter and, storing the edited image.

7. The method according to claim 6, wherein the smoothing filter is a bilateral filter.

8. The method according to any claim 1, further comprising the step of increasing a color saturation of the stored edited image by transforming the stored edited image to an HSL color space and multiplying each pixel in an S-channel of the edited image with a value greater than 1.

9. A non-transitory computer program product comprising a computer-readable medium with instructions for performing the method of claim 1.

10. A device for changing the appearance of an original image comprising N>1 classes of image elements, the device comprising:

a processor configured to, for each pixel and for at least one subset of the original image:

calculate N probability values, each probability value defining a probability of the pixel belonging to a corresponding one of the N classes of image elements, transform a color of the pixel by using predetermined color transforms for each of the N classes of image elements and the N probability values for the pixel, wherein the transformation is performed by:

calculating a specific color transform to be used for the pixel by, for each class of image elements of the N classes of image elements, multiplying the probability value for the pixel of belonging to the class of image elements with the color transform provided for the class of image elements, and summing the N products of the N multiplications, and transforming the color of the pixel by multiplying an original color of the pixel with the specific color transform for the pixel, and a memory adapted for storing a resulting color transformed image as an edited image.

11. A method for determining color transforms between a source image and a target image comprising N>1 classes of image elements, the method comprising the steps of:

for each pixel and for at least one subset of the source and target images:

calculating N probability values, each probability value defining the probability for the pixel of belonging to a corresponding one of the N classes of image elements, for each specific image element class of the N classes of image elements, identifying a color transform between the source image and the target image by using:

for at least some of the pixels in the source image for which the N probability values have been calculated, color values of the pixel and the probability for the pixel of belonging to the specific class of image elements, and, for at least some of the pixels in the target image for which the N probability values have been calculated, color values of the pixel and the probability for the pixel of belonging to the specific class of image elements.

12. The method of claim 11, wherein the source image and the target image are captured under different lighting conditions and/or using different image sensors and/or different optics.

13. The method of claim 11, wherein the source image and the target image depict a blood sample and wherein the N classes of image elements comprise at least two of: a class for cytoplasm of white blood cells, a class for nuclei of white blood cells, a class for red blood cells and a class for a background of the images.

14. A non-transitory computer program product comprising a computer-readable medium with instructions for performing the method of claim 11.

15. A device for determining color transforms between a source image and a target image comprising N>1 classes of image elements, the device comprising a processor configured to, for each pixel and for at least one subset of the source and target images:

calculate N probability values, each probability value defining the probability for the pixel of belonging to a corresponding one of the N classes of image elements, for each specific image element class of the N classes of image elements, identifying a color transform between the source image and the target image by using:

for at least some of the pixels in the source image for which the N probability values have been calculated, color values of the pixel and the probability for the pixel of belonging to the specific class of image elements, and, for at least some of the pixels in the target image for which the N probability values have been calculated, color values of the pixel and the probability for the pixel of belonging to the specific class of image elements.

* * * * *